(12) United States Patent
Khitrov et al.

(10) Patent No.: US 11,514,142 B2
(45) Date of Patent: Nov. 29, 2022

(54) SYSTEM AND METHOD FOR MULTI-MODAL CONTINUOUS BIOMETRIC AUTHENTICATION FOR MESSENGERS AND VIRTUAL ASSISTANTS

(71) Applicant: ID R&D, Inc., New York, NY (US)

(72) Inventors: Alexey Khitrov, New York, NY (US); Konstantin Simonchik, St. Petersburg (RU)

(73) Assignee: ID R&D, Inc., New York, NY (US)

( * ) Notice: Subject to any disclaimer, the term of this patent is extended or adjusted under 35 U.S.C. 154(b) by 887 days.

(21) Appl. No.: 16/396,551

(22) Filed: Apr. 26, 2019

(65) Prior Publication Data

US 2019/0332756 A1 Oct. 31, 2019

Related U.S. Application Data

(60) Provisional application No. 62/662,837, filed on Apr. 26, 2018.

(51) Int. Cl.
*G06F 21/00* (2013.01)
*G06F 21/32* (2013.01)
(Continued)

(52) U.S. Cl.
CPC .............. *G06F 21/32* (2013.01); *G06F 16/43* (2019.01); *G06V 40/172* (2022.01); *G10L 17/00* (2013.01);
(Continued)

(58) Field of Classification Search
CPC ........ G06F 21/32; G06F 16/43; G06F 21/316; G06V 40/172; G06V 40/70; G10L 17/00;
(Continued)

(56) References Cited

U.S. PATENT DOCUMENTS

| 10,019,561 B1 | 7/2018 | Shelton et al. |
| 2006/0117188 A1* | 6/2006 | Fiske ..................... G07C 9/37 713/186 |

(Continued)

FOREIGN PATENT DOCUMENTS

| RU | 2638775 C2 | 11/2014 |
| WO | 2015116403 A1 | 8/2015 |

(Continued)

*Primary Examiner* — Brandon Hoffman
*Assistant Examiner* — William A Corum, Jr.
(74) *Attorney, Agent, or Firm* — Millen, White, Zelano & Branigan, P.C.; William Nixon

(57) ABSTRACT

A user authentication method in a messaging application of an electronic device. The method comprises, if at least one text message is typed by a user in the messaging application, collecting image data relating to said user and behavioral data relating to said user, and, if at least one voice message is pronounced by said user in the messaging application, collecting image data relating to said user and voice data relating to said user. The method also comprises, depending on the type of the message from text messages and voice messages, determining an image recognition score based upon comparison of the collected image data relating to said user and a stored image template data relating to said user obtained during typing or pronouncing a message by said user during a prior session, determining a voice recognition score based upon comparison of the collected voice data relating to said user and a stored voice template data relating to said user obtained during pronouncing a message by said user during a prior session, and determining a behavioral recognition score based upon comparison of the collected behavioral data relating to said user and a stored behavioral template data relating to said user obtained when said user typed the message during a prior session. The method also comprises creating a biometric score by using fusion of the image recognition score and one of the voice recognition (Continued)

score and the behavioral recognition score, and authenticating said user using the biometric score.
Present invention allows to authenticate users in messaging applications or virtual assistants during typing and pronunciation of a message with high degree of accuracy.

19 Claims, 1 Drawing Sheet

(51) Int. Cl.
    *G06F 16/43*     (2019.01)
    *G10L 25/60*     (2013.01)
    *G10L 17/06*     (2013.01)
    *G10L 25/63*     (2013.01)
    *G10L 17/00*     (2013.01)
    *G06V 40/16*     (2022.01)

(52) U.S. Cl.
    CPC .............. *G10L 17/06* (2013.01); *G10L 25/60* (2013.01); *G10L 25/63* (2013.01)

(58) Field of Classification Search
    CPC ......... G10L 17/06; G10L 25/60; G10L 25/63; G10L 17/10
    See application file for complete search history.

(56) References Cited

U.S. PATENT DOCUMENTS

| | | | |
|---|---|---|---|
| 2013/0340041 A1* | 12/2013 | Bansal | G06F 21/32 726/3 |
| 2017/0193211 A1* | 7/2017 | Blake | H04L 67/22 |
| 2018/0007553 A1 | 1/2018 | Dutt et al. | |
| 2019/0050659 A1* | 2/2019 | Hwang | G06F 17/18 |
| 2020/0118570 A1* | 4/2020 | Kii | H04M 3/42204 |

FOREIGN PATENT DOCUMENTS

| | | |
|---|---|---|
| WO | 2015127256 A1 | 8/2015 |
| WO | 2015157021 | 10/2015 |

\* cited by examiner

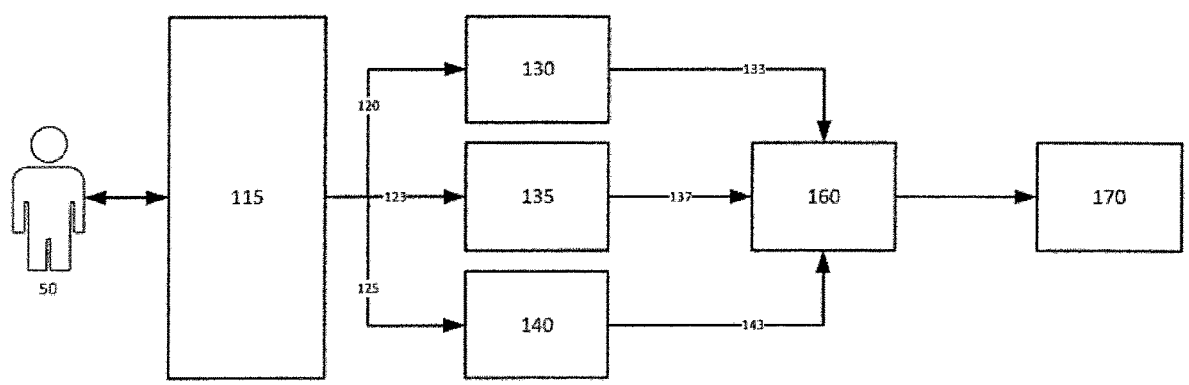

SYSTEM AND METHOD FOR MULTI-MODAL CONTINUOUS BIOMETRIC AUTHENTICATION FOR MESSENGERS AND VIRTUAL ASSISTANTS

TECHNICAL FIELD

The present invention relates generally to systems and methods for multi-modal continuous biometric authentication, and particularly, to systems and methods for multi-modal continuous biometric authentication based upon behavioral data, voice data and image data for messenger and virtual assistants.

BACKGROUND OF THE INVENTION

This application claims priority from Provisional Application 62/662,837, filed 26 Apr. 2018, entitled "A system method and apparatus for multi-modal continuous biometric authentication for messengers and virtual assistances".

As electronic devices (e.g., smartphones, tablets, etc.) increasingly store and access personal/private data, protection of such devices and data is becoming more critical. Current security measures (e.g., ID and password or PIN) provide limited protection because they are often reused and can be forgotten by users, stolen from them, hacked, etc.

The field of biometrics in which measuring of physical characteristics is used to recognize identity or to verify the claimed identity of an individual has emerged as an increasingly reliable methodology for verification (one-to-one) and identification (one-to-many) of individuals. Biometrics has become a very powerful tool in solving of problems associated with requiring positive identification of individuals.

Recently, many studies on biometrics have been conducted. Biometrics is widely applied to biometric authentication systems using face or iris recognition, mobile phone security, mobile commerce, physical/logical access control, e-commerce, and the like. However, poor attention is paid to authentication in messengers, virtual assistants, chat-bots and other applications of such type that are used by large amount of users in the world.

The way consumers communicate with an enterprise and each other is constantly changing. One of the growing trends is use of Conversational Interface where information and services are provided through conversations, e.g. communication using chats. In order to be able to share sensitive data and conduct monetary transactions enterprise needs to authenticate users.

Different user authentication systems used in electronic devices to protect against intruders are known in the state of art, including continuous user authentication systems. Known continuous user authentication systems are used to authenticate a user during any user interaction with an electronic device. In other words, known user authentication systems are based on collecting general user information, for example, while there occur processes of viewing a photo, listening to music or recording videos, etc. by a user. Known authentication systems are common and not specific for narrow tasks, such as user authentication in messaging application, using virtual assistants or chat-bots.

Interest for continuous frictionless authentication within the Conversational Interface is growing rapidly. Many consumers are required to be authorized using biometrics methods combining any available biometric modalities for authentication a user without asking him or her to perform any additional activities (frictionless non-collaborative biometrics).

SUMMARY OF THE INVENTION

One of the goals of the present invention is to authenticate users continuously and with a high degree of accuracy without necessity of any additional actions from a user while said user interacts with a messenger or a virtual assistant.

Fusing of behavioral biometrics, image recognition and voice recognition provides strong authentication, while actions from a user to be verified are kept at a minimum.

Present invention allows drastically simplifying user experience of a biometric multi-modal authentication process for messengers and virtual assistants.

Known processes of biometric authentication include active participation from a user like requesting the user to position his or her face in front of a camera, to pronounce additional passphrases, to type additional login/password. Present innovative invention simplifies this process, allowing using frictionless noncollaborative authentication for messaging application, virtual assistants, while providing strong multi-modal biometric authentication.

In one aspect of the present invention, proposed is a user authentication method in a messaging application of an electronic device, where the messaging application provides communication using at least two types of messages including text messages and voice messages. The method comprises, if at least one text message is typed by a user in the messaging application, collecting image data relating to said user and behavioral data relating to said user, and, if at least one voice message is pronounced by said user in the messaging application, collecting image data relating to said user and voice data relating to said user. Further, depending on the type of the message from text messages and voice messages, the method comprises determining an image recognition score based upon comparison of the collected image data relating to said user and a stored image template data relating to said user obtained during typing or pronouncing a message by said user during a prior session, determining a voice recognition score based upon comparison of the collected voice data relating to said user and a stored voice template data relating to said user obtained during pronouncing a message by said user during a prior session, and determining a behavioral recognition score based upon comparison of the collected behavioral data relating to said user and a stored behavioral template data relating to said user obtained during typing a message by said user during a prior session. The method also comprises creating a biometric score by using fusion of the image recognition score and one of the voice recognition score and the behavioral recognition score, and providing an authentication result of user authentication based on the biometric score.

In one embodiment, the method further comprises collecting behavioral data relating to said user, if a voice message is pronounced by said user.

In another embodiment, the method comprises the step of creating a biometric score is additionally based upon fusion of the behavioral recognition score in addition to the image recognition score and the voice recognition score.

In still another embodiment, the method comprises creating a biometric score further depends on quality of the collected image data relating to said user, quality of the collected voice data relating to said user and quality of the collected behavioral data relating to said user.

In still another embodiment, the method comprises collecting behavioral data relating to said user is based upon a manner of typing the at least one text message.

In still another embodiment, the image data is at least one collected image of said user, and the stored image template data is at least one image of said user.

In still another embodiment, the step of determining the image recognition score is further based on selecting a best image of said user of the at least one of collected image of said user by use of a quality ranking, wherein the best image is used for comparison with the stored image template data of said user.

In still another embodiment, the step of determining the image recognition score is based upon comparison of each image of the at least one of collected image of said user with a stored image template data of said user obtained during typing or pronouncing a message by said user.

In still another embodiment, the authentication result of said user is based upon comparing of the biometric score with at least one threshold value.

In still another embodiment, the method may comprise the authentication result comprises information indicative of at least one of an authentication determination and a level confidence.

In still another embodiment, the authentication result for said user is received by a recipient of the at least one text message or the at least one voice message.

In still another embodiment, the recipient decides a degree of trust for the said user according to the received authentication result of said user.

In still another embodiment, said user does not receive the authentication result.

In some embodiments, the method may comprise if a plurality of messages are created by said user, authentication of said user is based upon the biometric score which is calculated for each text message or voice message.

In some embodiments, at least one of the prior session is either a prior enrollment session and a prior authentication session.

Present invention also provides a user authentication system, which is designed for fast and accurate user authentication in messaging applications or virtual assistants during user's interaction with a messaging application or virtual assistants to typing and pronunciation of a message. The proposed user authentication system provides secure user communication in a messaging application. Additionally, the proposed user authentication system allows radically simplifying user's experience with biometric multi-modal authentication process for messengers and virtual assistants.

BRIEF DESCRIPTION OF THE DRAWINGS

While the specification concludes with claims particularly pointing out and distinctly claiming the present invention, it is believed the same will be better understood from the following description taken in conjunction with the accompanying drawing which illustrates, in a non-limiting fashion, the best mode presently contemplated for carrying out the present invention, wherein:

FIG. 1 illustrates an example system according to one embodiment of the present invention.

DETAILED DESCRIPTION OF THE PREFERRED EMBODIMENTS

The present invention will now be described more fully with reference to the drawing in which an embodiment of the present invention is shown. The subject matter of this disclosure may, however, be embodied in many different forms and should not be construed as being limited to the embodiments set forth herein.

Embodiments of the present invention are directed toward providing ongoing authentication, when a user interacts with a messaging application of an electronic device, by collecting biometric data. Biometric data, such as image data relating to said user, voice data relating to said user and behavioral data relating to said user, can be extracted from sensor data obtained during user interaction with the messaging application in form of typing or pronouncing message(s) and stored for further use during authentication to authenticate the user later. The stored biometric data can be compared with newly captured biometric data to provide a comparison result, or score, that indicates a level of confidence based on how the newly captured biometric data matches with the stored biometric data. This authentication result can be used in an authentication determination, based in which it can be concluded that a user is authorized or not.

Biometric data collection for subsequent storage and use when comparing during authentication is carried out in one messaging application. However, in other embodiments, more than one messaging application or virtual assistants may be used for subsequent storage.

The present invention is intended to be used with messaging applications such that it can be integrated into messaging applications, in particular into messengers, in which communication is mostly made through text and voice messages, preferably short text and voice messages. Examples of specific messaging applications in which the proposed system can be used are chat-bots of different types, Skype, WhatsApp, Telegram, VKontakte, virtual assistant applications, etc.

The techniques for authentication described herein can be utilized in a wide variety of electronic devices. Some of such devices can include personal electronic devices such as personal computers, tablets, mobile phones, i.e. representing any devices in which messaging applications can be installed and used. Electronic devices in which the proposed authentication system can be applied must preferably have a video input (camera), an audio input (microphone), and a physical or vertical keyboard. Moreover, some embodiments of the present invention may utilize a plurality of interconnected devices performing different aspects of the techniques disclosed herein.

FIG. 1 shows a block diagram illustrating an example system according to one embodiment of the present invention, where input, collecting of biometric data, and other features can be implemented utilizing the techniques disclosed herein. It can be understood that blocks shown in FIG. 1 are provided as an example. Other embodiments may omit, add, and/or substitute blocks. A person of ordinary skill in the art will recognize many variations. Components shown in FIG. 1 can be implemented using a variety of software and/or hardware incorporated into and/or coupled with an electronic device.

The proposed user authentication method can be implemented using a user authentication system proposed in the present invention. A messaging application in connection with which the present invention can be implemented should provide communication using at least two types of messages including text messages and voice messages. Further, the messaging application can provide communication using other types of messages including, for example, video messages, image messages, etc. A message type is determined using the user interface of the system, in particular, for example, when a user wants to send a voice message, he or she can click an icon in the messaging application responsible for starting recording of a voice message.

The method further comprises collection of biometric data relating to a user 50 while he or she interacts with a messaging application 115 to type or pronounce a message. Collection of biometric data includes collection of image data 120 relating to said user 50, voice data 123 relating to said user 50 and behavioral biometric data 125 relating to said user 50 as shown in FIG. 1.

The user interface includes a video input such as a camera. While the user 50 interacts with the messaging application 115 with his or her typical manner to type or pronounce a message, the camera continuously captures the image data 120 relating to said user. The image data 120 may represent at least one image of the user's entire face or a part of it, for example, a chin, iris scans; also, the image data 120 may be an image of the user's neck and ears. If the user interacts with the messaging applications on a mobile device, it can be comprehended that a front camera can take images of the user.

The user interface also includes an audio input, for example, in form of a microphone. While the user 50 interacts with the messaging application 115 with his or her typical manner to pronounce a message, the microphone continuously captures voice data 123 relating to said user. In the present invention, a short voice message is enough to collect the voice data 123.

The example system comprises one or more sensors. While the user 50 interacts with the messaging application 115 with his or her typical manner to type a message by using the keyboard, one or more sensors continuously captures behavioral data 125 relating to said user. The behavioral data 125 may be keystroke dynamics relating to said user, for example, a press and release time associated with a key code, a number of errors while typing a message, a message typing speed, etc. In addition, the behavioral data 125 may be based on a device location based on GPS location, WiFi and Blue-tooth connection, data based on measurements of an accelerometer incorporated into the device, a tilt angle of the electronic device during message typing, measurements of a gyroscope incorporated into the device.

In some embodiments, collection of behavioral data relating to said user is made when the user 50 interacts with the messaging application 115 with his or her typical manner to pronounce a message. In this case, the behavioral data 125 can include a tilt angle of the device during the pronunciation of the message, data based on measurements of the gyroscope, a device location based on GPS location, WiFi and Blue-tooth connection, data based on measurements of the accelerometer.

Therefore, if at least one text message is typed by the user in the messaging application, image data relating to said user and behavioral data relating to said user are collected, and, if at least one voice message is pronounced by said user in the messaging application, image data relating to said user, voice data relating to said user and additionally, if necessary, behavioral data relating to said user are collected.

Further, determining of a recognition score for each type of biometric data is performed, depending on the type of message including text messages or voice messages. The recognition score for each type of biometric data is determined in the corresponding block of a processing unit as shown in FIG. 1.

In particular, in block 130 a best image of said user from a plurality of collected image data 120 of said user is selected by use of a quality ranking (for example, a smallest facial rotation angle, highest sharpness, etc.). Then an image recognition score 133 is determined based upon comparison of the selected best image relating to said user and a stored image template data relating to said user obtained during typing or pronouncing a message by said user during a prior session, where the message typed or pronounced by said user during a prior session can be of any type.

In some embodiments, determining of an image recognition score is possible based upon comparison of each image of the plurality collected image data of said user and a stored image template data relating to said user obtained during typing or pronouncing a message by said user during a prior session. In this case, the method further comprises combining of results of the plurality of comparisons into a single image recognition score.

In block 135, a voice recognition score 137 is determined based upon comparison of the collected voice data relating to said user and a stored voice template data relating to said user obtained during pronouncing a message by said user during a prior session.

In block 140, a behavioral recognition score 143 is determined based upon comparison of the collected behavioral data relating to said user and a stored behavioral template data relating to said user obtained during typing a message by said user during a prior session.

In each case including determination of the voice recognition score 137 and of the behavioral recognition score 143, the message typed or pronounced by said user during a prior session can also be of any type.

In some embodiments, determination of a behavioral recognition score is possible based upon comparison of some behavioral data (for example, keystroke dynamics relating to said user and GPS location of the electronic device) of the plurality collected behavioral data of said user and a stored behavioral template data relating to said user obtained during typing or pronouncing a message by said user during a prior session. In this case, the method further comprises combining of results of the plurality of comparisons into a single behavioral recognition score.

The prior session is a prior enrollment session in which a biometric data, such as image data, voice data and behavioral data relating to said user, can be extracted during an enrollment or registration process and stored for further use during authentication. Enrollment or registration process is limited to a period of time during which a user interacts with an application for typing and pronunciation of a message. Such period of time may be a few hours, days, or months. The duration of the enrollment or registration process affects the amount of collected biometric data and quality of the created template(s) and stored biometric data and, consequently, accuracy of further user authentication.

In some embodiments, the prior session is a prior authentication session in which image data and voice data of an authenticated user and behavioral data relating to said user are used for later comparison in the form of stored image data and stored voice data and stored behavioral template data relating to said user.

In some embodiments, biometric template data are updated by collecting biometric data in the process of user interaction with the messaging application. For example, ten most recent biometric data of each type using which a user was positively authenticated can be used for the biometric template data. Thus, the biometric template data can be updated after each authentication.

Further, the method according to the present invention comprises, depending on the type of the message (text messages or voice messages), creating a biometric score by using fusion of the recognition scores. The biometric score for each type of message is created in block 160 of the processing unit as shown in FIG. 1.

Block 160 continuously collects recognition scores 133, 137, 143 transmitted from previous blocks 130, 135, 140 and synchronizes collected information in time. Block 160 combines different recognition scores by using fusion of the recognition scores and produces resulting biometric decision (so called biometric score). In particular, the biometric score can be created by using fusion of the image recognition score and one of the voice recognition score and the behavioral recognition score, depending on the type of the message (modalities availability) in the following way:

1. If a voice message is typed by said user, the step of creating a biometric score is based upon fusion of the image recognition score and the behavioral recognition score.

2. If a text message is pronounced by said user, the step of creating a biometric score is based upon a fusion of the image recognition score and the voice recognition score.

3. In some embodiments, if a voice message is pronounced by said user, the step of creating a biometric score is additionally based upon fusion of the behavioral recognition score in addition to the image recognition score and the voice recognition score.

In some embodiments, the biometric score further can be created depending on a quality of the collected image data relating to said user, the collected voice data relating to said user and the collected behavioral data relating to said user. For example, if the quality of the collected image data is low, then the biometric score for text messages is generated based on the behavioral recognition score. In order to create the biometric score for text messages, it is necessary to take into account as much of the collected behavioral data as possible. Also, in case of poor image quality, a biometric score for voice messages is created by using fusion of voice recognition score and behavioral recognition score, or based on one of these recognition scores. The same is true in case of poor quality of the collected voice data or behavioral data.

It should be noted that a processing unit is located in a messaging application server with which the user authentication system according to the present invention is integrated. In some embodiments, the processing unit can be incorporated directly into the electronic device.

Further, the created biometric score is used for authentication of said user, in particular for creating an authentication result for said user in block 170 of the processing unit as shown in FIG. 1.

The authentication result of said user can be based upon comparing of the biometric score with at least one threshold value. The minimum threshold value of authentication can vary on a messaging application and/or functionality within a messaging application. For example, a banking application may require a higher level of authentication than a shopping application. Furthermore, a banking application may require a lower threshold of authentication when a user wants to transfer $5 than when the user wants to transfer $15,000.

The authentication result can comprise information indicative of at least one of an authentication determination and a level confidence. For example, if there is one threshold value, an authentication result will be one of positive or negative (authentication determination), and if there are several threshold values, the authentication result will indicate a level of confidence.

It should be noted that the biometric score is calculated for each of text messages or voice messages. When a user types or pronounces more than one message, it is possible to accumulate biometric data to create templates. In addition, the user is authenticated for each message, which makes authentication process to be continuous. The proposed method which provides continuous authentication allows to clarify identity of the user and improve accuracy of authentication with each message sent, which increases reliability of user authentication.

The proposed user authentication method protects a user from attackers sending messages on behalf of the specified user. In addition, the proposed method aims to ensure that recipient who communicates with the user can be sure that it is the specific user who sent a message or messages, and not someone else who seized his electronic device or somehow got into the account of the user.

In some embodiments, the authentication result for said user is received by a recipient of a text message or a voice message. Each message sent by the user is marked for the recipient with a flag indicating an authentication result for the user. For example, each message can be marked with a green checkmark in case the user is authenticated, and a red checkmark if the user is not authenticated. Also, for example, each message can be marked with a green, red or yellow checkmark, which indicates doubts with different levels regarding an authentication result (a level of confidence). The flags indicating a user authentication result can be percentages, any symbols, animation, images, etc. According to the received authentication result of said user, the recipient decides a degree of trust for the said user.

The proposed user authentication method allows for implicit (frictionless) authentication. In other words, the user does not need to enter a login and password or in any other similar way perform a registration for communication in the messaging application. In addition, collection biometric data and authentication determination takes place during natural interaction (in a typical manner) with a messaging application during typing or pronunciation of a message, i.e. the proposed method does not require positioning a face of a user if a part of the face was not in the frame. In some embodiments, said user does not receive the authentication result.

The proposed method provides implicit authentication and facilitates use of messaging application or virtual assistants, saves users' time required to enter, for example, for typing a login and password. The fact that a user does not receive an authentication result allows protecting the user's account from attackers, because in case an attacker has taken control of a user's account, he will not be able to pass authentication and will not receive an authentication result, and thus he will send a message again, which will allow the recipient to determine with a high degree of accuracy that he is communicating with the attacker.

The present invention improves accuracy of user authentication in messaging applications or virtual assistants due to the fact that the collected biometric data relating to the user during typing and pronunciation of a message in messaging applications are compared with a stored biometric data obtained only during typing and pronunciation of a message in messaging applications.

It is assumed that when using a messaging application, people have a certain pattern of behavior using which and collecting information at this particular moment makes it possible to do a more accurate algorithm that will more accurately perform authentication of users. The stored biometric data obtained only during typing and pronunciation of a message most accurately reflects features related to a user during his or her interaction with the messaging application and allows to create the most accurate template data for authentication in the messaging application. For example, inclination of a user's head while typing a message, a manner in which messages were typed, an angle of the device when the user typed messages, a particular voice during typing of messages and so on are specific features of the user that allow to create a narrowly focused template data that allows to authenticate the user with high accuracy.

Known solutions are not as effective as the stored data related to a user collected during general use of an electronic device. The stored data obtained in this way is not specific, and the result of the comparison of the obtained data during user's interaction with the messaging application and said stored data cannot provide high accuracy of user authentication in the application.

Other examples of the application using the present invention include any self-service systems, any contact services, systems for providing medical services remotely, i.e. any communication services.

For example, the present invention can be used by banking applications in which a user sends a question to a bank and based on this question, a ban system authenticates (or does not authenticate) the user without asking him or her for a login and password. In this case, the user's question can be a text or voice message, the user account will be the login, and the password will be a biometric template data relating to the user. Moreover, the biometric template data relating to the user will be pre-created and saved directly on a server of the banking application. Similarly, the present invention can be used in telecommunication services, in which communication with a mobile operator is necessary to clarify the status of the account or change the tariff.

Also, for example, the present invention can be used in online stores for making purchases without requesting a login and a password. Moreover, a user account can be connected with other user data, for example, an address and phone number, which will not be further requested during ordering process, and in this case, the user will only need to type a name or indication of a desired purchase in a search bar.

The proposed user authentication system allows to get rid of using a login and a password, provides possibility to confirm identity of a user in a process of communication.

In addition, one of the examples of the application of the present invention can be any messaging application using which a user communicating with his or her interlocutor (friend, wife, husband, parents, etc.) wants to be sure that the interlocutor is the interlocutor confirmed by authentication. For example, nowadays there are many examples when attackers which seized or stole an electronic device or a user account write messages to the user's relatives with requests to transfer them money. This risk group includes elderly people who do not additionally check a user who sent them such messages.

Also, the present invention can prevent cases when attackers which stole an electronic device or a user account, while the user a parent, send messages to children of the user, for example, making an appointment in some place.

The proposed authentication system allows to protect and interlocutor from attackers, because the interlocutor will see the result of user authentication for each message.

It will be apparent to one of skill in the art that described herein is a novel system and method for multi-modal biometric authentication for continuous interface. While the invention has been described with reference to specific preferred embodiments, it is not limited to these embodiments. The invention may be modified or varied in many ways and such modifications and variations as would be obvious to those skilled in the art are within the scope and spirit of the invention and are included within the scope of the following claims.

What is claimed is:

1. A method of user authentication in a messaging application of an electronic device, the messaging application providing communication using at least two types of messages including text messages and voice messages, the method comprising:
   if at least one text message is typed by a user in the messaging application, collecting image data relating to said user and behavioral data relating to said user; and
   if at least one voice message is pronounced by said user in the messaging application, collecting image data relating to said user and voice data relating to said user;
   depending on the type of the message from text messages and voice messages:
      determining an image recognition score based upon comparison of the collected image data relating to said user and a stored image template data relating to said user obtained during typing a text message or pronouncing a voice message by said user during a prior session,
      determining a voice recognition score based upon comparison of the collected voice data relating to said user and a stored voice template data relating to said user obtained during pronouncing a voice message by said user during a prior session, and
      determining a behavioral recognition score based upon comparison of the collected behavioral data relating to said user and a stored behavioral template data relating to said user obtained during typing a text message by said user during a prior session;
   creating a biometric score by using fusion of the image recognition score and one of the voice recognition score and the behavioral recognition score; and
   providing an authentication result of user authentication based on the biometric score.

2. The method of claim 1, further comprising collecting behavioral data relating to said user if at least one voice message is pronounced by said user.

3. The method of claim 2, wherein the step of creating a biometric score is additionally based upon fusion of the behavioral recognition score in addition to the image recognition score and the voice recognition score.

4. The method of claim 1, wherein creating a biometric score further depends on quality of the collected image data relating to said user, quality of the collected voice data relating to said user and quality of the collected behavioral data relating to said user.

5. The method of claim 1, wherein collecting behavioral data relating to said user is based upon a manner of typing the at least one text message.

6. The method of claim 1, wherein the image data is at least one collected image of said user, and the stored image template data is at least one image of said user.

7. The method of claim 6, the step of determining the image recognition score is further based on selecting a best image of said user of the at least one of collected image of said user by use of a quality ranking, wherein the best image is used for comparison with the stored image template data of said user.

8. The method of claim 6, wherein the step of determining the image recognition score is based upon comparison of each image of the at least one of collected image of said user with a stored image template data of said user obtained during typing a text message or pronouncing a voice message by said user.

9. The method of claim 1, wherein the authentication result of said user is based upon comparing of the biometric score with at least one threshold value.

10. The method of claim 1, wherein the authentication result comprises information indicative of at least one of an authentication determination and a level confidence.

11. The method of claim 9, wherein the authentication result for said user is received by a recipient of the at least one text message or the at least one voice message.

12. The method of claim 11, wherein the recipient decides a degree of trust for the said user according to the received authentication result of said user.

13. The method of claim 9, wherein said user does not receive the authentication result.

14. The method of claim 1, wherein if a plurality of messages are created by said user, authentication of said user is based upon the biometric score which is calculated for each text message or voice message.

15. The method of claim 1, wherein at least one of the prior session is either a prior enrollment session and a prior authentication session.

16. A user authentication system for authentication a user in a messaging application of an electronic device, the messaging application providing communication using at least two types of messages including text messages and voice messages, the system comprising:
a user interface configured to determine a type of at least one message created by the user from a text message and a voice message, wherein the user interface is configured to collect image data relating to said user and voice data relating to said user when said user interacts with the messaging application to type the at least one text message or pronounce the at least one voice message;
one or more sensors configured to collect behavioral data relating to said user when said user interacts with the messaging application to type the at least one text message or pronounce the at least one voice message; and
a processing unit connected to the user interface and the one or more sensors and configured to:
obtain the collected image data relating to said user and behavioral data relating to said user during typing of a text message by said user in the messaging application;
obtain the collected image data relating to said user and voice data relating to said user during pronouncing of a voice message by said user in the messaging application;
determine an image recognition score based upon comparison of the collected image data relating to said user and a stored image template data relating to said user obtained during typing a text message or pronouncing a voice message by said user during a prior session;
determine a voice recognition score based upon comparison of the collected voice data relating to said user and a stored voice template data relating to said user obtained during pronouncing a voice message by said user during a prior session;
determine a behavioral recognition score based upon comparison of the collected behavioral data relating to said user and a stored behavioral template data relating to said user obtained during typing a text message by said user during a prior session;
create a biometric score by using fusion of the image recognition score and one of the voice recognition score and the behavioral recognition score depending on the type of message; and
provide an authentication result of said user based upon the biometric score.

17. The system of claim 16, wherein the user interface comprises at least one of a virtual keyboard on a touchscreen of the electronic device and a physical keyboard of the electronic device.

18. The system of claim 16, wherein said user interface includes an audio input and a video input.

19. The system of claim 16, wherein at least one of the sensors is either a location sensor, a gyroscope and an accelerometer.

* * * * *